H. K. ALLEN.
SPRING WHEEL.
APPLICATION FILED JAN. 28, 1914.
1,121,600.
Patented Dec. 22, 1914.
2 SHEETS—SHEET 1.
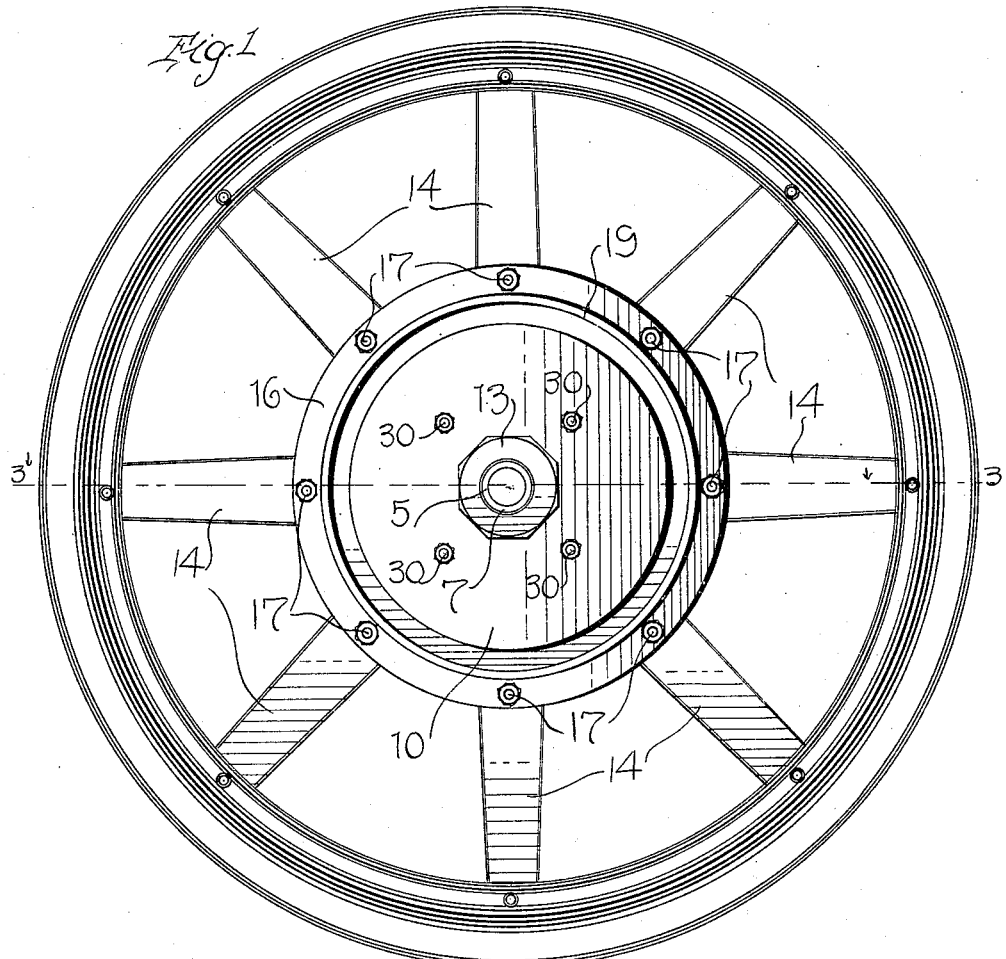
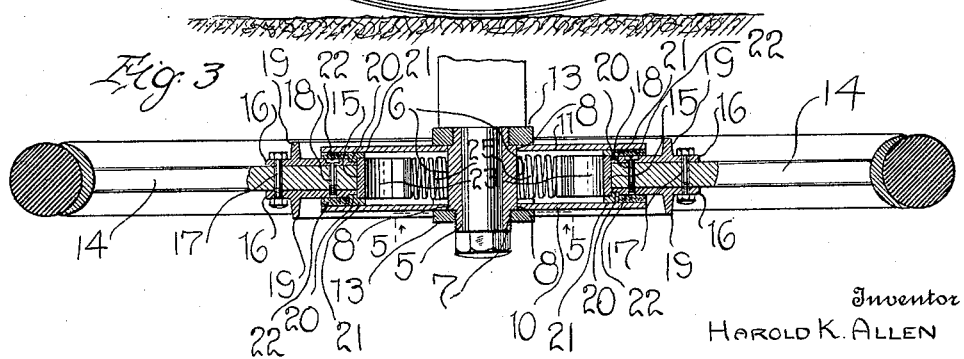
Inventor
Harold K. Allen
Witnesses
Robert M. Sutphen
A. L. Hind
By Watson E. Coleman
Attorney

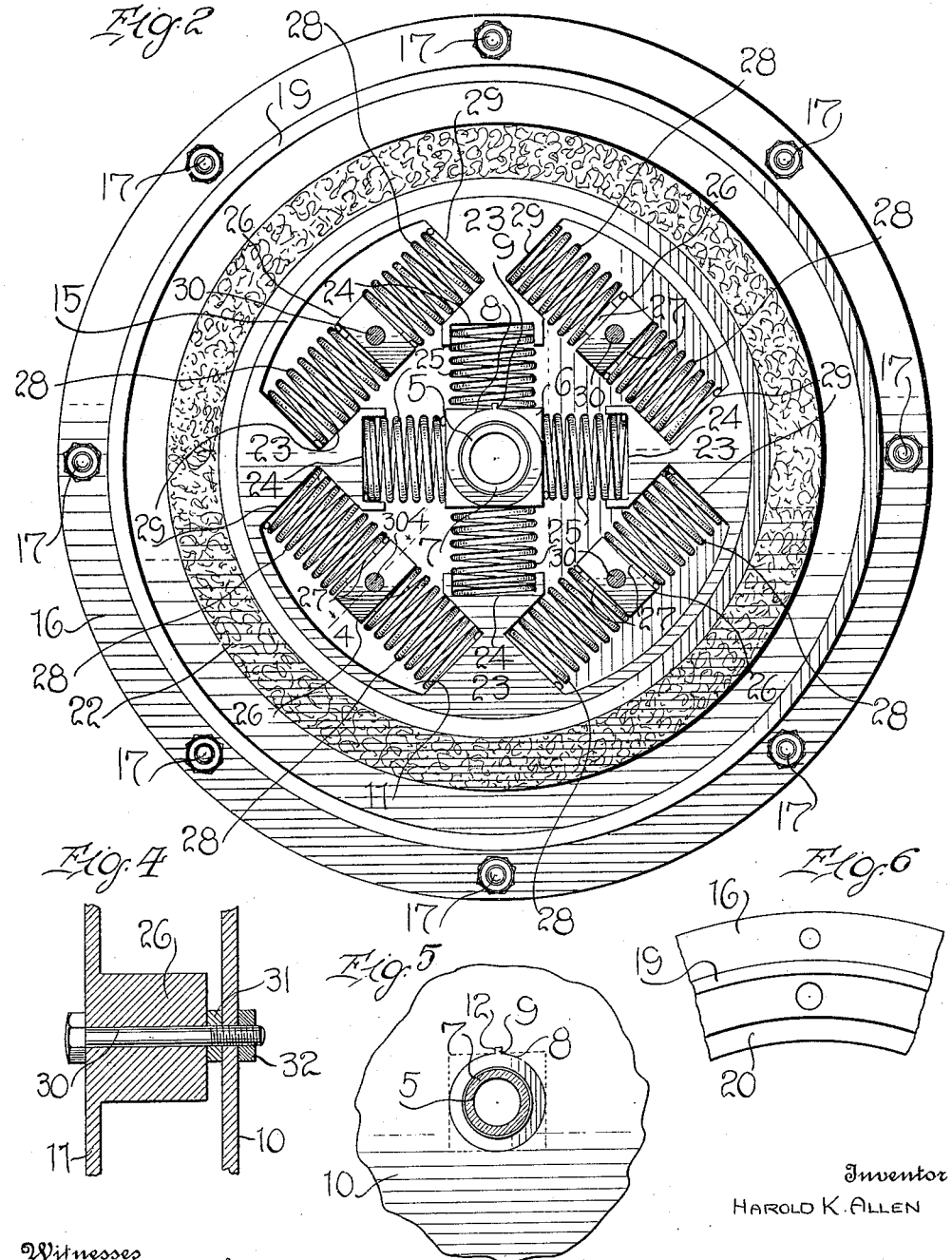

UNITED STATES PATENT OFFICE.

HAROLD K. ALLEN, OF BELCHERTOWN, MASSACHUSETTS.

SPRING-WHEEL.

1,121,600. Specification of Letters Patent. Patented Dec. 22, 1914.

Application filed January 28, 1914. Serial No. 815,003.

*To all whom it may concern:*

Be it known that I, HAROLD K. ALLEN, a citizen of the United States, residing at Belchertown, in the county of Hampshire and State of Massachusetts, have invented certain new and useful Improvements in Spring-Wheels, of which the following is a specification, reference being had to the accompanying drawings.

This invention relates to improvements in spring wheels for automobiles and other vehicles and has for its general object to simplify and increase the operating efficiency of wheels of that type commonly known in the art as "resilient hub" wheels.

The invention has for a more particular object to provide an improved arrangement and mounting of the cushioning springs in the hub of the wheel which normally act to maintain the wheel rim in concentric relation to the hub, and will admit of the driving power being directly applied to the hub of the wheel without liability of distorting or in any manner impairing the efficiency of the springs.

The invention has for a further object to provide an improved packing whereby the entrance of dust and grit to the interior of the wheel hub and its collection upon the springs is effectually prevented.

The invention has for a more specific object to provide a retaining ring for the plurality of hub springs which is of improved construction, said ring containing radially and circumferentially arranged series of springs.

It is a further object of my invention to produce a spring wheel of the above character, the several parts of which are of very simple form and may be produced at small cost, said parts being also capable of easy and quick assemblage in their proper co-operative positions or disassemblage when necessary in order to obtain access thereto for the purpose of repair.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a spring wheel embodying my invention in the preferred form. Fig. 2 is an enlarged side elevation of the hub with the face plate removed. Fig. 3 is a section taken on the line 3—3 of Fig. 1. Fig. 4 is a section taken on the line 4—4 of Fig. 2. Fig. 5 is a section taken on the line 5—5 of Fig. 3. Fig. 6 is a detail fragmentary view of one of the spoke connecting plates.

Referring in detail to the drawings, 5 designates the hub sleeve or thimble which is formed with a central rectangular body portion 6 and the reduced cylindrical exteriorly threaded end portions 7. By reducing the ends of the hub sleeve or thimble annular shoulders 8 are produced, and projecting from said shoulders key lugs 9 are integrally formed upon the periphery of the reduced ends of the sleeve.

10 and 11 indicate the inner and outer face plates respectively of the hub, each of said plates being centrally provided with an opening of sufficient diameter to be engaged over the reduced end 7 of the hub. A slot or recess 12 is formed in the edge of this opening to receive the key lug 9 whereby the face plate is locked upon the hub sleeve for turning movement therewith. Lock nuts 13 are provided upon the opposite ends of the sleeve to secure the face plates in position thereon.

The spokes 14 of the wheel are fixed in any desired manner at their outer ends to the wheel rim and the inner ends thereof are suitably secured upon the periphery of the spring retaining ring 15. It is of course understood that the wheel spokes extend radially from the ring 15 in the usual manner. These spokes are held in their relative positions by the clamping plates 16, said plates being engaged upon opposite sides of the spokes and connected together at their outer edges by means of bolts 17. As an additional connecting means for the spoke engaging plates screws 18 are employed, said screws being provided with heads upon one of their ends which are countersunk in the face of one of the plates 16. Each of these plates is formed with an outwardly projecting annular flange 19 the purpose of which will be later explained.

The inner edge of each of the spoke engaging plates 16 upon the outer face of the plate is rabbeted or recessed as at 20, which, together with the spring retaining ring 15 produces annular grooves to receive the enlarged portions of the metal packing rings 21. These rings occupy the space between the edges of the plates 16, and the opposed faces of the face plates 10 and 11. Heavy felt packing rings 22 are arranged between the rings 21 and the outer edges of the plates 10 and 11, said packing rings being disposed between the hub plates and the plates 16.

The retaining ring 15 is formed with a plurality of inwardly extending diametrically opposed bearing arms 23. Each of these arms is formed upon its inner end with a socket or seat 24 for the outer end of a radially disposed spring 25. The inner end of this spring is secured to one face of the rectangular portion 6 of the hub sleeve. Upon the back plate 11 of the hub, the bearing blocks 26 are integrally formed. These blocks are of substantially rectangular form and are provided upon opposite sides with cylindrical studs or projections 27. Over these projections the inner ends of the circumferentially arranged series of coil springs 28 are engaged. These springs are arranged in pairs between the bearing arms 23 of the retaining ring and engage at their outer ends against the obliquely disposed faces 29 of said arms.

The face plates 10 and 11 of the wheel hub are connected together and held against relative movement by means of the transverse bolts 30 which extend through coinciding openings in said plates and the bearing blocks 26. It is, however, to be noted that the blocks 26 do not extend entirely across the space between said face plates but are slightly spaced from the inner face of the plate 10. Spacing washers 31 are disposed upon the bolts 30 between the plate 10 and the bearing blocks 26. Nuts 32 are threaded upon the bolts and bear upon the outer face of the plate 10 whereby said plate is held in spaced relation to the other hub plate 11.

In assembling the several parts of the wheel, the back plate 11 is placed over one of the reduced ends of the hub sleeve 5, it being understood that the annular packing strip of felt 22 is adhesively or otherwise secured upon the outer side of the plate 16. The spring retaining member 15 on the inner ends of the spokes 14 upon the opposite edges of which the metal packing rings are engaged is now placed in position. The springs 25 and 28 are then arranged between the bearing arms and the hub sleeve and between said arms and the bearing blocks on the plate 11. The outer face plate 10 is lastly arranged in position and the bolts 30 inserted through the coinciding openings in said plate and the blocks 26. After tightening the nuts 32 upon the ends of said bolts to clamp the plates in position and adjusting the jam nuts 13 on the ends of the hub sleeve, the wheel is in condition for use. It is of course understood that the washers 31 are arranged upon the bolt 30 between the bearing blocks 26 and the hub plate 10. When the packing rings 21 and the felt packing 22 becomes worn, these washers may be removed and the nuts 32 adjusted upon the bolts 30 to force the plate 11 inwardly and maintain a tight engagement of the felt packing strips with the outer faces of the spoke clamping plates 16.

In the operation of the device, the radially disposed springs 25 which are interposed between the retaining member 15 and the hub sleeve yieldingly maintain the rim of the wheel in concentric relation to the hub and absorb radial thrust, thereby effectually preventing the transmission of shocks and jars through the wheel to the body of the vehicle. The springs 28 which are arranged in the retaining member 15 at angles of substantially 45° yieldingly hold the wheel rim against circumferential movement with relation to the hub and through the medium of said springs the driving tractive force is effectually utilized for the propulsion of the vehicle. These springs admit of the application of power directly to the wheel hub but at the same time they absorb pressure applied tangentially against the periphery of the wheel. By the provision of the annular flanges 19 upon the spoke clamping plates 16 and the felt packing strips 22, the entrance of dust and dirt to the interior of the wheel hub is prevented.

From the foregoing description taken in connection with the accompanying drawings, it is believed that the construction, manner of operation and several advantages of my invention will be clearly and fully understood. The several parts of the wheel are of exceedingly simple form and may be produced at small manufacturing cost. The wheel may be also very easily and quickly assembled and by simply removing the outer face plate 10 of the wheel hub, access may be had to the springs 25 and 28 so that any one or more of said springs can be readily removed and replaced for new ones. By arranging the springs and the hub of the wheel as above described, a maximum of elasticity is obtained. It will, however, be understood that in wheels designed for use upon heavy automobile trucks or other purposes the springs may be multiplied in number, the general disposition or arrangement of the same, however, being adhered to. It is to be further understood that in putting the invention into practical use I contemplate resorting to various other minor modifications in the form, proportion and arrangement of the several elements that may be deemed advisable in accordance with the particular use for which the wheel is designed, and I reserve the privilege of resorting to all such mechanical changes as may fairly fall within the spirit and scope of the invention as claimed.

What is claimed is:

1. In a spring wheel, the combination of a hub sleeve, face plates keyed upon the opposite ends of said sleeve, a spring-retaining member secured to the inner ends of the wheel spokes radially movable between said plates, said member including a series of radially-disposed arms, bearing blocks carried by one of the face plates and spaced from the opposite plate, said blocks being located between the bearing arms, a series of radially-disposed springs engaged at their inner ends upon the hub sleeve and at their outer ends with the arms of said retaining member, an additional series of circumferentially-arranged springs engaged with the bearing blocks and the arms of said retaining member, annular plates secured upon the opposite sides of the wheel spokes, packing rings secured to the inner faces of the face plates and engaging said annular plates, bolts extending through the bearing blocks and the face plate which is opposed thereto, and nuts threaded upon the ends of said bolts for adjusting said face plates to compensate for wear of the packing rings and maintain the same in frictional contact with the annular spoke plates.

2. In a spring wheel, the combination of a hub sleeve, face plates keyed upon the opposite ends of said sleeve, one of said face plates having bearing blocks integrally formed therewith, and spaced from the opposite plate, a spring retaining ring carried by the wheel proper and disposed for radial and circumferential movement between said face plates, said ring being provided with diametrically opposed inwardly extending arms each provided with a plurality of bearing sockets, a series of radially disposed springs engaged in the corresponding sockets of said arms and bearing at their inner ends against the said sleeve, an additional series of circumferentially disposed springs seated in the remaining sockets of said arms at one of their ends and engaged at their other ends with the bearing blocks upon the face plate, and packing rings arranged between the edges of said bearing ring and the outer edges of said face plates.

In testimony whereof I hereunto affix my signature in the presence of two witnesses.

HAROLD K. ALLEN.

Witnesses:
Geo. H. B. Green,
Roswell Allen.

Copies of this patent may be obtained for five cents each, by addressing the "Commissioner of Patents, Washington, D. C."